(12) United States Patent
Sapio

(10) Patent No.: US 7,939,755 B1
(45) Date of Patent: May 10, 2011

(54) ELECTRICAL OUTLET BOX ASSEMBLY

(76) Inventor: Russell A. Sapio, Carlisle, PA (US)

( * ) Notice: Subject to any disclaimer, the term of this patent is extended or adjusted under 35 U.S.C. 154(b) by 267 days.

(21) Appl. No.: 12/195,981

(22) Filed: Aug. 21, 2008

(51) Int. Cl.
*H02G 3/12* (2006.01)

(52) U.S. Cl. ............... 174/58; 174/53; 174/60; 174/64; 248/205.1; 52/220.1

(58) Field of Classification Search .............. 174/53, 174/50, 58, 59, 60, 64, 57; 220/3.3, 3.6, 220/3.9; 248/205.1, 217.1; 52/220.1
See application file for complete search history.

(56) References Cited

U.S. PATENT DOCUMENTS

| 1,875,101 | A | | 8/1932 | Morrell | |
|---|---|---|---|---|---|
| 2,130,839 | A | | 9/1938 | Conners | |
| 2,875,915 | A | | 3/1959 | Buckels | |
| 4,348,547 | A | * | 9/1982 | Bowden, Jr. | 174/666 |
| D286,768 | S | | 11/1986 | Borsh et al. | |
| 5,594,207 | A | | 1/1997 | Fabian et al. | |
| 5,841,068 | A | * | 11/1998 | Umstead et al. | 174/58 |
| D459,312 | S | | 6/2002 | Roesch et al. | |
| 6,414,241 | B1 | | 7/2002 | O'Donnell | |
| 6,774,307 | B2 | | 8/2004 | Kruse et al. | |
| 7,087,836 | B2 | | 8/2006 | Archer et al. | |
| 7,098,399 | B1 | | 8/2006 | Gretz et al. | |

* cited by examiner

*Primary Examiner* — Dhiru R Patel

(57) ABSTRACT

A electrical outlet box assembly includes a first housing and a second housing. Each of the first and second housings has a size to receive an electrical outlet. The first and second housings each include a rear wall and a perimeter wall that is attached to and extends forward of the perimeter wall. The perimeter walls of the first and second housings each have a front edge defining an opening for receiving an electrical outlet. The perimeter walls of the first and second housings are attached together and the openings of the first and second housings face in opposite directions with respect to each other.

4 Claims, 6 Drawing Sheets

ELECTRICAL OUTLET BOX ASSEMBLY

BACKGROUND OF THE INVENTION

Field of the Invention

The present invention relates to electrical box devices and more particularly pertains to a new electrical box device for allowing a pair of electrical outlets to be mounted so that they face in opposite directions with respect to each other.

SUMMARY OF THE INVENTION

The present invention meets the needs presented above by generally comprising a first housing and a second housing. Each of the first and second housings has a size to receive an electrical outlet. The first and second housings each include a rear wall and a perimeter wall that is attached to and extends forward of the perimeter wall. The perimeter walls of the first and second housings each have a front edge defining an opening for receiving an electrical outlet. The perimeter walls of the first and second housings are attached together and the openings of the first and second housings face in opposite directions with respect to each other.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
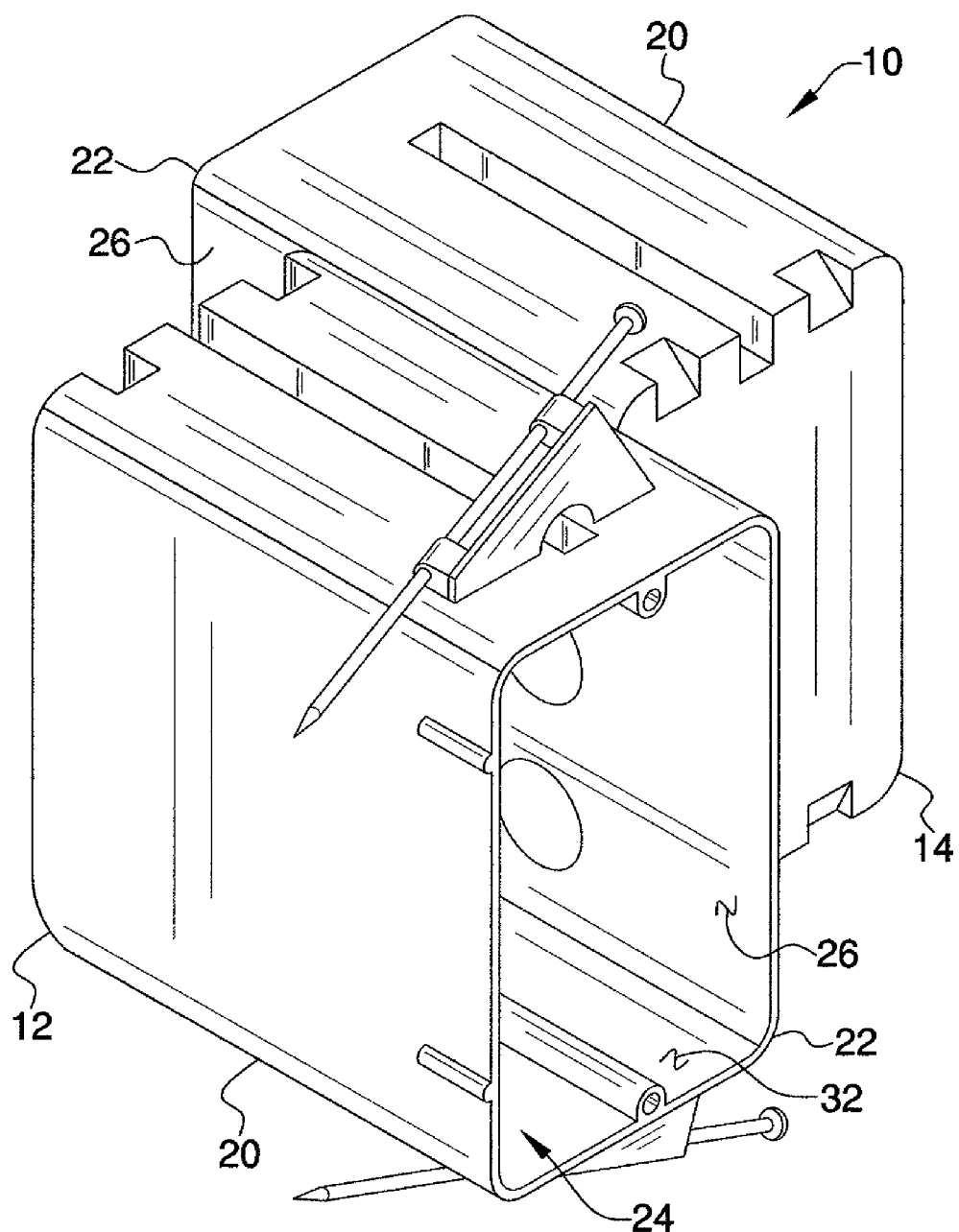
FIG. 1 is a top perspective view of an electrical outlet box assembly according to the present invention.
Figure 2:
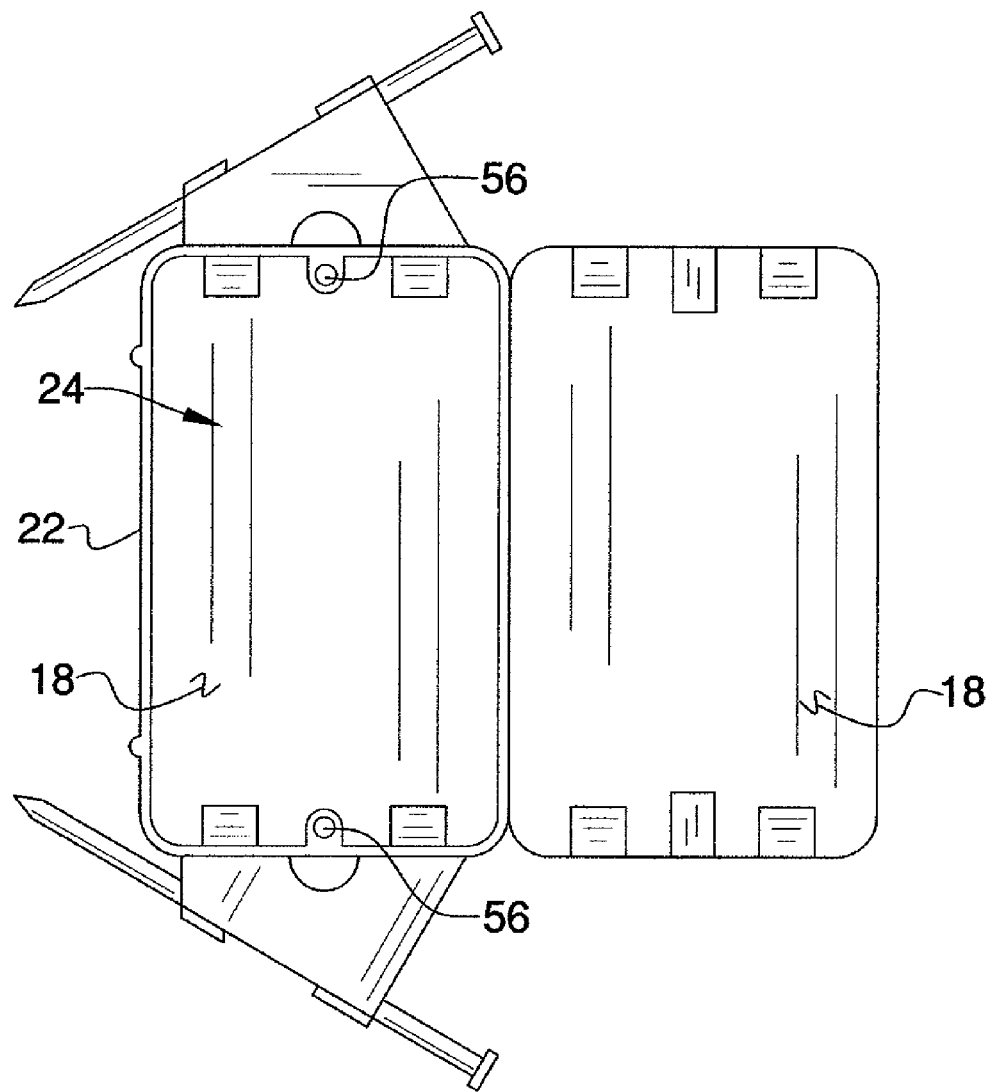
FIG. 2 is a front view of the present invention.
Figure 3:
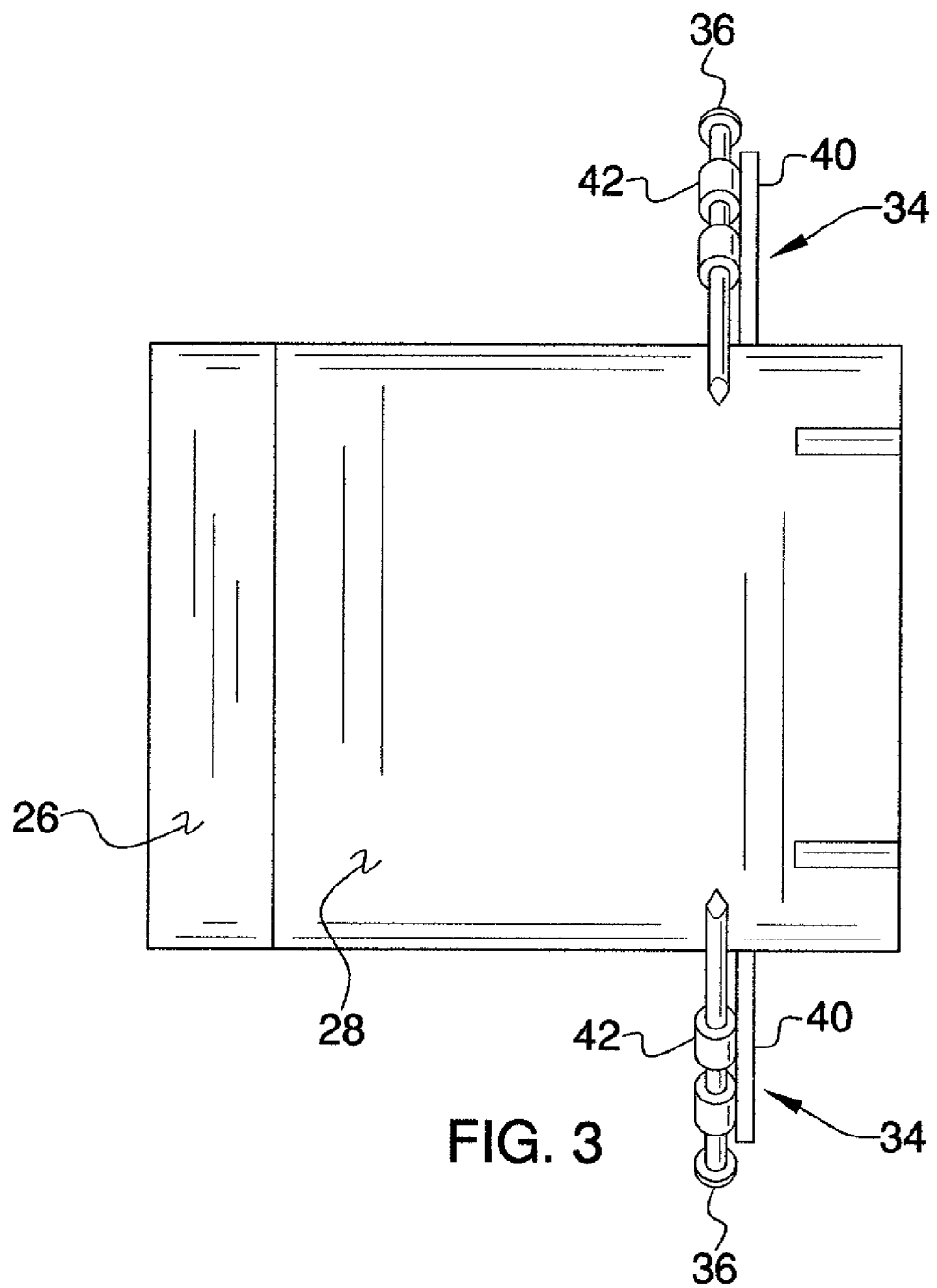
FIG. 3 is a right side view of the present invention.
Figure 4:
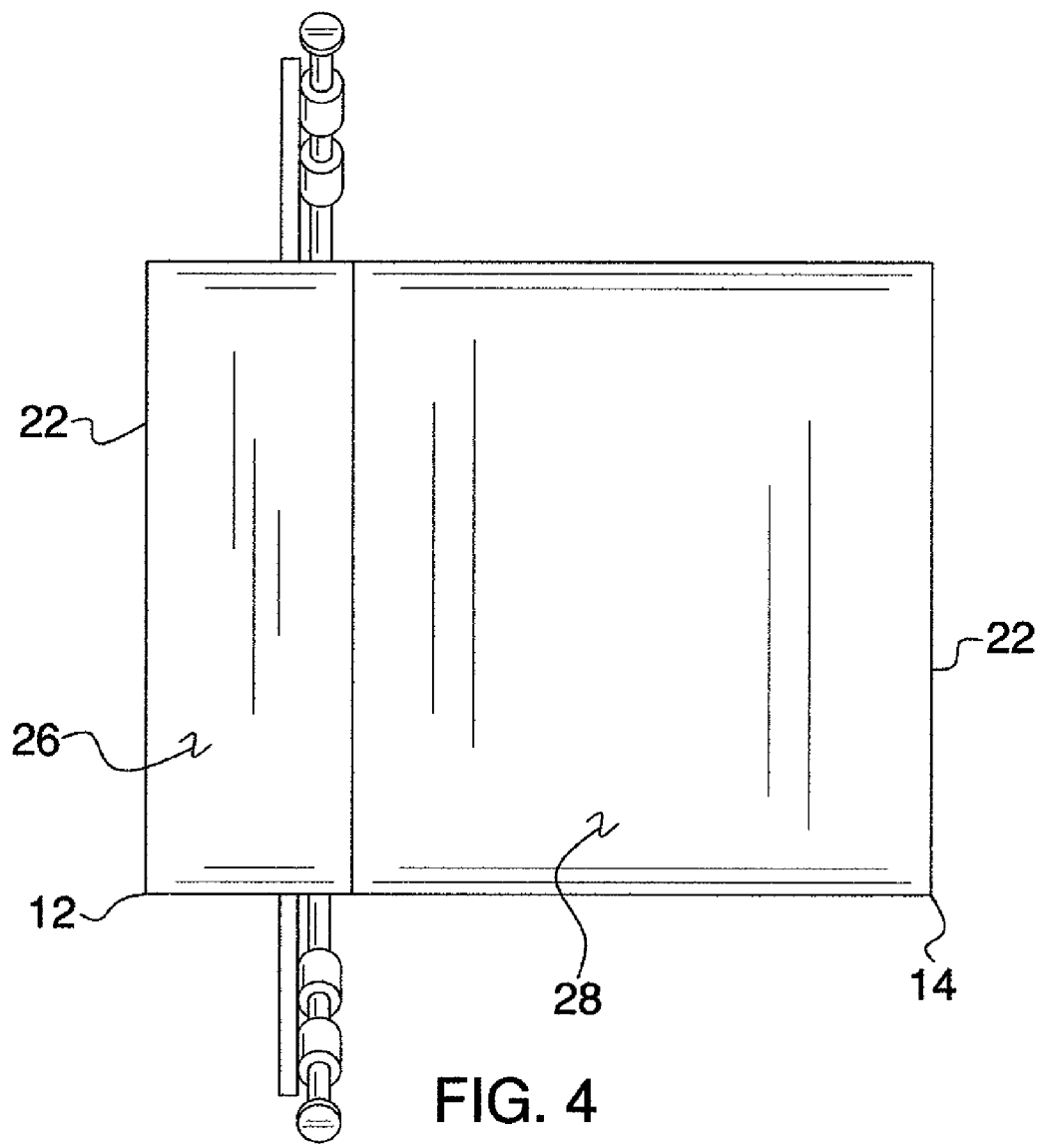
FIG. 4 is a left side view of the present invention.
Figure 5:
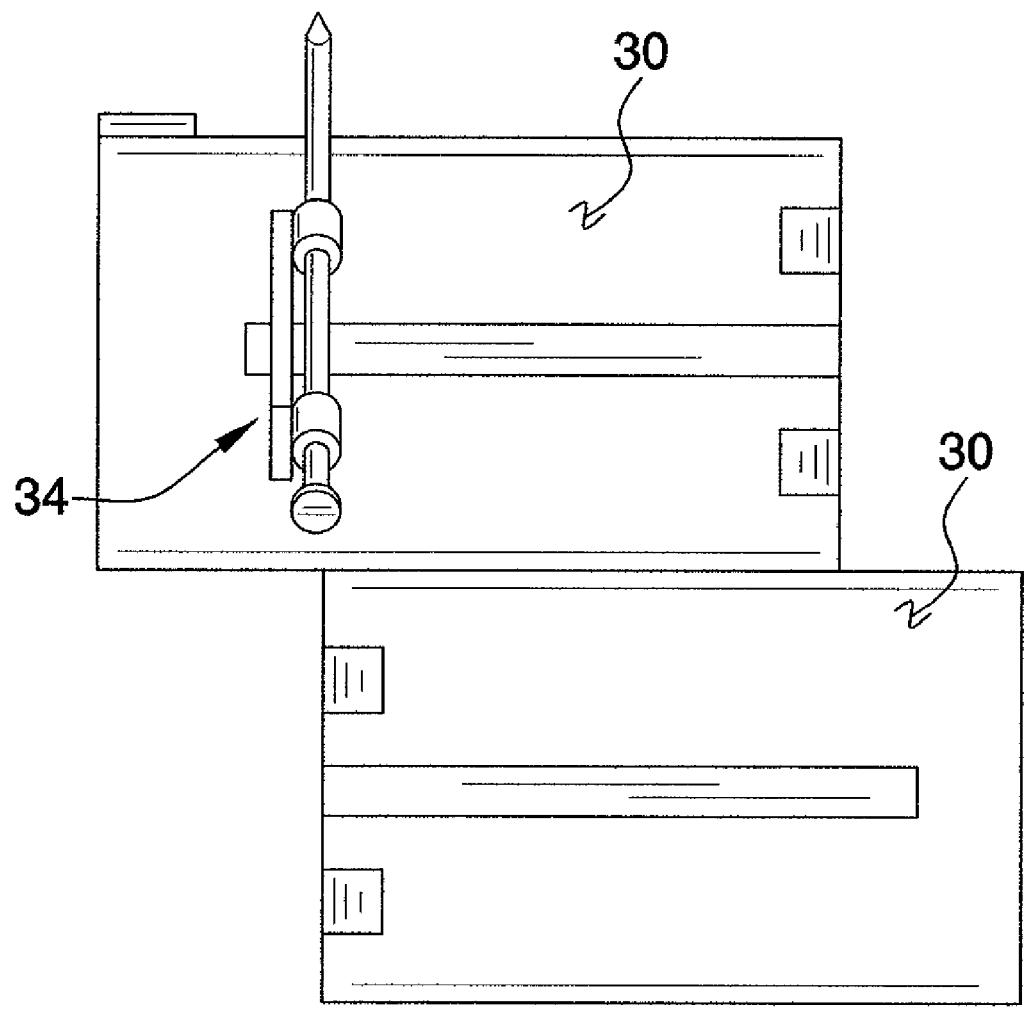
FIG. 5 is a top view of the present invention.
Figure 6:
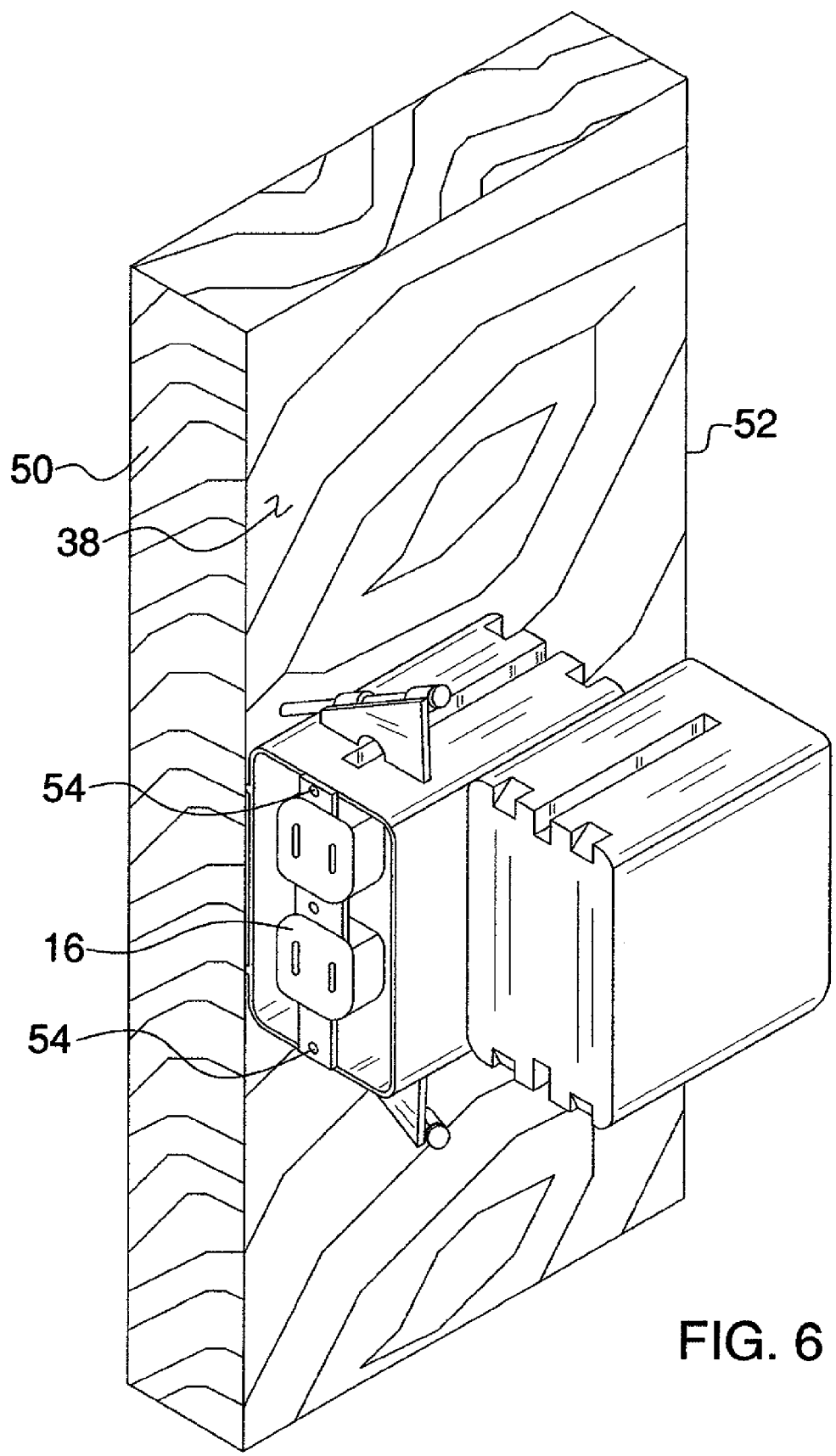
FIG. 6 is an in-use view of the present invention.

With reference now to the drawings, and in particular to FIGS. 1 through 6 thereof, a new electrical box device embodying the principles and concepts of the present invention and generally designated by the reference numeral 10 will be described.

As best illustrated in FIGS. 1 through 6, the electrical outlet box assembly 10 generally comprises a first housing 12 and a second housing 14. Each of the first 12 and second 14 housings has a size to receive an electrical outlet 16. The first 12 and second 14 housings each include a rear wall 18 and a perimeter wall 20 that is attached to and extends forward of the perimeter wall 20. The perimeter walls 20 of the first 12 and second 14 housings each have a front edge 22 defining an opening 24. The perimeter wall 20 of the first 12 and second 14 housings each include a first lateral wall 26, a second lateral wall 28, a top wall 30 and a bottom wall 32. Each of the housings 12, 14 has a height equal to 3⁵⁄₁₆ inches, a width equal to 2³⁄₁₆ inches and depth equal to 3¼ inches. A distance from the front edge 22 of the first housing 12 to the front edge 22 of the second housing 14 is 4½ inches.

The perimeter walls 20 of the first 12 and second 14 housings are attached together. The openings 24 of the first 12 and second 24 housings face in opposite directions with respect to each other. The first lateral 26 walls of the first 12 and second 14 housings are attached together. The front edge 22 of the first housing 12 extends rearward of the rear wall 18 of the second housing 14. The front edge 22 of the second housing 14 extends rearward of the rear wall 18 of the first housing 12.

A pair of fastener receivers 34 is provided. Each of the fastener receivers 34 is attached to the first housing 12. Fasteners 36, such as nails, are extendable through the fastener receivers 34 and into a support surface 38. One of the fastener receivers 34 is attached to the top wall 30 of the first housing 12 and one of the fastener receivers 34 is attached to the bottom wall 32 of the first housing 12. Each of the fastener receivers 34 is positioned adjacent to the front edge 22 of the first housing 12. The fastener receivers 34 each include a plate 40 extending away from the first housing 12. At least one loop 42 is attached to each of the plates 40 and the fasteners 34 are extendable through the loop 42 to secure the first housing 12 to the support surface 38 which may be a wall stud.

In use, the first housing 12 is attached to a wall stud, or support surface 38, as shown above. The positioning of the first housing 12, having its front edge 22 flush with the edge 50 of the wall stud 38, positions the front edge 22 of the second housing 14 so that it will be flush with an opposite edge 52 of the wall stud 38. This will allow conventional electrical outlets 16 to be easily mounted on opposite sides of a wall. The electrical outlets 16 may be attached to the housings 12, 14 by way of securing members 54 extendable through tabs 56 attached to the perimeter walls 20. The housings 12, 14 may have apertures extending therethrough, not shown, for receiving electrical wiring.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An electrical box assembly for receiving electrical outlets, said assembly comprising:

a first housing and a second housing, each of said first and second housings having a size to receive an electrical outlet, said first and second housings each including a rear wall and a perimeter wall being attached to and extending forward of said perimeter wall, said perimeter walls of said first and second housings each having a front edge defining an opening, wherein electrical outlets are positionable in said openings and mountable to said housings;

said perimeter walls of said first and second housings being attached together, said openings of said first and second housings facing in opposite directions with respect to each other; and a pair of fastener receivers, each of said fastener receivers being attached to said first housing, wherein fasteners are extendable through said fastener receivers and into a support surface, one of said fastener receivers being attached to said top wall of said first housing, one of said fastener receivers being attached to said bottom wall of said first housing, each of said fastener receivers being positioned adjacent to said front edge of said first housing.

2. The assembly according to claim 1, wherein said first housing is attached to a wall stud with said fasteners, said front edge of said first housing being flush with a first edge of said wall stud, a front edge of said second housing being flush with a second edge of said wall stud wherein said first and second edges of said wall stud are positioned opposite of each other.

3. An electrical box assembly for receiving electrical outlets, said assembly comprising:

a first housing and a second housing, each of said first and second housings having a size to receive an electrical outlet, said first and second housings each including a rear wall and a perimeter wall being attached to and extending forward of said perimeter wall, said perimeter walls of said first and second housings each having a front edge defining an opening, said perimeter wall of said first and second housings each including a first lateral wall, a second lateral wall, a top wall and a bottom wall, wherein electrical outlets are positionable in said openings and mountable to said housing;

said perimeter walls of said first and second housings being attached together, said openings of said first and second housings facing in opposite directions with respect to each other, said first lateral walls of said first and second housings being attached together, said front edge of said first housing extending rearward of said rear wall of said second housing, said front edge of said second housing extending rearward of said rear wall of said first housing; and a pair of fastener receivers, each of said fastener receivers being attached to said first housing, wherein fasteners are extendable through said fastener receivers and into a support surface, one of said fastener receivers being attached to said top wall of said first housing, one of said fastener receivers being attached to said bottom wall of said first housing, each of said fastener receivers being positioned adjacent to said front edge of said first housing.

4. The assembly according to claim 3, wherein said first housing is attached to a wall stud with said fasteners, said front edge of said first housing being flush with a first edge of said wall stud, a front edge of said second housing being flush with a second edge of said wall stud wherein said first and second edges of said wall stud are positioned opposite of each other.

* * * * *